(12) United States Patent
Sawada

(10) Patent No.: US 7,887,658 B2
(45) Date of Patent: Feb. 15, 2011

(54) APPARATUS FOR BUILDING TIRE AND METHOD FOR USING SAME

(75) Inventor: Chihiro Sawada, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 862 days.

(21) Appl. No.: 11/658,077

(22) PCT Filed: Jul. 15, 2005

(86) PCT No.: PCT/JP2005/013125

§ 371 (c)(1),
(2), (4) Date: Aug. 6, 2007

(87) PCT Pub. No.: WO2006/009098

PCT Pub. Date: Jan. 26, 2006

(65) Prior Publication Data

US 2008/0099127 A1 May 1, 2008

(30) Foreign Application Priority Data

Jul. 21, 2004 (JP) .............................. 2004-213117

(51) Int. Cl.
*B29D 30/26* (2006.01)
*B29D 30/24* (2006.01)
(52) U.S. Cl. .................. 156/133; 156/415; 156/417
(58) Field of Classification Search ................ 156/414, 156/415, 417, 111, 123, 133
See application file for complete search history.

(56) References Cited

U.S. PATENT DOCUMENTS

| 1,860,342 | A | * | 5/1932 | Heston | ........................ | 156/415 |
| 3,769,856 | A | * | 11/1973 | Casey | ........................ | 156/414 |
| 3,867,231 | A | * | 2/1975 | Casey | ........................ | 156/415 |

(Continued)

FOREIGN PATENT DOCUMENTS

EP 1 433 591 A1 6/2004

(Continued)

OTHER PUBLICATIONS

Supplementary European Search Report dated Oct. 26, 2009 (5 pages).

*Primary Examiner*—Geoffrey L Knable
(74) *Attorney, Agent, or Firm*—Sughrue Mion, PLLC

(57) ABSTRACT

An apparatus for building tire comprises an outer shaft 3, an intermediate shaft 2, and a center shaft 1 which are disposed coaxially with each other, a building drum 14 supported on the outer shaft 3 and having a uniform outer diameter over the entire length, and means for rotating these shafts disposed on one side of the building drum 14. The building drum 14 consists of axially divided two drum portions 15, 16 which are displaced in mutually approaching and separating directions and are radially expanded and contracted. The intermediate shaft 2 is reciprocably connected to one drum portion 15. The one drum portion 15 is drivably connected to the other drum portion 16 to be able to reciprocably move in mutually opposite directions. Cam members 28, 29 bringing the drum portions into radial expansive/contractive transformations are reciprocably connected to the center shaft 1. The apparatus further comprises a first motor constantly drivably connected to the intermediate shaft 2 and to the center shaft 1 and selectively drivably connected to the outer shaft 3, and a second the second motor constantly drivably connected to the center shaft 1.

14 Claims, 7 Drawing Sheets

U.S. PATENT DOCUMENTS

| | | |
|---|---|---|
| 4,131,500 A | 12/1978 | Wilde et al. |
| 5,264,068 A | 11/1993 | Masuda |
| 2003/0047284 A1 | 3/2003 | Akiyama |
| 2003/0051817 A1* | 3/2003 | Sawada .................. 156/403 |
| 2005/0000624 A1 | 1/2005 | Tokunaga |

FOREIGN PATENT DOCUMENTS

| | | | |
|---|---|---|---|
| JP | 4-329126 A | | 11/1992 |
| JP | 11-165358 A | | 6/1999 |
| JP | 2000-254982 A | | 9/2000 |
| JP | 2000-296563 A | | 10/2000 |
| JP | 2003-71950 A | | 3/2003 |
| JP | 2003-80612 A | | 3/2003 |
| JP | 2004-122658 A | * | 4/2004 |
| WO | 03/095185 A1 | | 11/2003 |
| WO | WO-2005/009725 A1 | * | 2/2005 |

* cited by examiner (a)

(b)

(c)

APPARATUS FOR BUILDING TIRE AND METHOD FOR USING SAME

TECHNICAL FIELD

The present invention relates to a general-purpose tire building apparatus for building a pneumatic tire, particularly suitable for building a side-reinforcing rubber used for a side-reinforcing rubber layer of a so-called runflat tire capable of continuously stably running over a predetermined distance even under a condition of losing an internal pressure of a tire, the side-reinforcing rubber layer being disposed on an inner surface of a side portion of the tire to support a load in case of a blowout or the like and having a generally crescent transversal sectional shape, and suitable for using in attaching the side reinforced rubber to an inner peripheral surface of a cylindrical carcass band, and to a method for using such an apparatus.

RELATED ART

As a runflat tire having a radial structure and enabling vehicles to drive safely even in case of a blowout or the like, there has been come into practical use, for example, a so-called side-reinforced type runflat tire 202 in which a side-reinforcing rubber layer 200 having generally crescent transversal sectional shape is disposed on a side portion of a tire, as shown in FIG. 8. In FIG. 8, the reference numerals 204, 206, 207, 208, 210, 212, 214, and 216 denote a carcass, a bead core, a bead filler, an inner liner, a side wall, a tread, a belt and a canvas chafer, respectively.

Meanwhile, as a commonly used method for producing a green tire for a radial tire, there is known a method for building a green tire, for example, comprising the steps of winding an inner liner rubber on a band drum of which a diameter does not substantially change in the axial direction; setting a carcass member and a bead core on the outer peripheral side of the inner liner rubber; folding back them; applying a sidewall rubber; subsequently transporting them to a shaping drum; and setting a belt member, a tread rubber and the like on the outer peripheral side of the shaping drum.

When a green tire for a runflat tire is built pursuant to this method, an inner liner rubber 208A, a side reinforced rubber 200A and two plies forming a carcass member 204A are sequentially stuck and integrated on a band drum 209 to built a cylindrical intermediate member 218, as shown in FIG. 9.

Upon building a green tire for a runflat tire in this manner, it is necessary to form a thick side-reinforcing rubber 200A on the band drum 209 which rubber 200A has generally crescent transversal shape and is elevated from the band drum 209. Therefore, when the carcass member 204A is stuck to the outer peripheral side of the side-reinforcing rubber 200A, it is necessary to prevent an occurrence of crimps on the carcass member 204A and air entrapment between the carcass member 204A and the side-reinforcing rubber 200A.

To cope with this, there is suggested, in Patent Document 1, a technique to prevent an occurrence of crimps on the carcass member and air entrapment, in which an annular side-reinforcing rubber is formed in a line groove provided on a band drum and a carcass member is cylindrically stuck to the outer peripheral side of the side-reinforcing rubber, so that the carcass member is flat in the axial direction and has a cylindrical shape.

[Patent Document 1] Japanese Patent Application Laid-Open No. 2003-71950

SUMMARY OF THE INVENTION

Problems to be Solved by the Invention

However, according to the suggested technique, it is necessary to preliminarily prepare the line grooves on the band drum and, therefore, the band drums themselves corresponding to the number of kinds of the side-reinforcing rubbers having different positions to be disposed, thicknesses, widths and sectional shapes depending on the tire size. This involves problems of requiring more man-hour for changing the band drum as well as increasing a equipment cost, an administrative cost and the like. Moreover, the situation is almost the same with the case where the portions of the band drum having line grooves are separately replaceable.

The present invention is directed to solve these problems, and the object of the present invention is to provide a tire building apparatus and a method for using such an apparatus, in which a single building drum is always properly applied to building the side-reinforcing rubbers of tires of various sizes to minimize the equipment cost, administrative cost and the like and to effectively suppress an increase of the man-hour for changing the tire size or the like, and in which various displacements and deformations of the building drum can be properly operated at a required position without any assistances of external means and forms before and after the displacements and deformations can be simply self-controlled and self-recognized.

Means for Solving Problems

A tire building apparatus according to the present invention comprises an outer shaft, an intermediate shaft, and a center shaft which are disposed coaxially with each other, a building drum supported on the outer shaft and having a uniform outer diameter over the entire length, and means for rotating the respective shafts disposed on one side of the building drum, wherein the apparatus is mounted on, for example, a driving dolly and can be moved to a required work station as required, the building drum consists of axially divided two drum portions which are displaced in mutually approaching and separating directions and are radially expanded and contracted, the intermediate shaft is reciprocably connected to one drum portion with, for example, a screw means rotated by a plurality of gear mechanisms, the one drum portion is drivably connected to the other drum portion preferably with a rack-and-pinion at a plurality of positions in a circumferential direction to be able to reciprocably move in mutually opposite directions, and cam members bringing the drum portions into radial expansive/contractive transformations and directly bringing a plurality of arc segments composing primary parts of the drum portions are reciprocably connected to the center shaft, for example, in a screwed manner, and wherein the apparatus further comprises a first motor, for example a servomotor constantly drivably connected to the intermediate shaft and to the center shaft via a differential speed reducer and selectively drivably connected to the outer shaft, and a second motor, for example, a servomotor constantly drivably connected to the center shaft via a differential speed reducer.

As mentioned above, the intermediate shaft is preferably drivably connected to the one drum portion with, for example, a thread shaft rotated by the gear mechanism. Also, the drum portions are preferably drivably connected to each other with the gear mechanism including one or more pinions disposed on the outer shaft.

Furthermore, it is preferable that the cam members passing through and disposed on the outer shaft are screwed into the center shaft to be able to move in mutually opposite directions or in the same direction.

Meanwhile, it is preferable that the cam members provided with inclined cam surfaces inclined in mutually opposite directions are engaged with driven inclined surfaces of the arc segments composing the primary parts of the drum portions.

Moreover, it is preferable that the first motor is drivably connected to the intermediate shaft, to the center shaft via a differential speed reducer and to the outer shaft via a clutch, and that the second motor is drivably connected to the center shaft via a differential speed reducer.

In such apparatus, in order to certainly prevent an unexpected rotation of an undesired shaft, it is preferable that one or more brakes to restrain the rotation of at least one of the outer shaft and the center shaft, and that elastic covers are provided to air-tightly cover the outer peripheral surfaces of a plurality of the arc segments of the drum portions and to air-tightly close the mutually opposed surfaces of the drum portions.

In this case, it is preferable that negative pressure introduction passages to between the drum portions are provided and that negative pressure suction openings opened toward a part or all of the arc segments of the drum portions and toward the elastic covers.

A method for using a tire building apparatus according to the present invention in which any one of the above-mentioned tire building apparatus is used to form a side-reinforcing rubbers and stick the formed side-reinforcing rubber to an inner peripheral surface of a cylindrical carcass band laid on the outer peripheral side of a building drum, the method comprising the steps of: determining the outer diameters and axial relative positions of paired drum portions corresponding to the tire size and the relative positions in accordance with rotational movements of center and intermediate shafts; shaping the side-reinforcing rubber having a required shape and dimension into an annular shape on the drum portions under the rotation of the drum portions due to the rotational movement of all shafts; radially expanding the side-reinforcing rubbers toward the carcass band laid on the outer peripheral side of the building drum in accordance with displacements of a cam member following the rotation of the center shaft under the action of the arc segments of the drum portions; and, after the maximum diameter portion of the side-reinforcing rubber are abutted against the inner peripheral surface of the carcass band, simultaneously performing an approaching displacement of the both drum portions and therefore the both side-reinforcing rubbers and an axially contracting displacement of the carcass band based on the rotation of the intermediate shaft while continuously expanding the side-reinforcing rubbers further to tightly contact the entire outer peripheral surfaces of the side reinforced rubbers with the inner peripheral surfaces of the carcass band.

In this method, it is preferable that air is removed from between both drum portions in the state where the side-reinforcing rubbers are in contact with the inner peripheral surface of the carcass band due to the radial expansion of the side-reinforcing rubber, preferably as soon as the side-reinforcing rubbers touch the carcass band.

EFFECT OF THE INVENTION

The tire building apparatus of the present invention enables the building drum having the uniform outer diameter over its entire length, more specifically the two drum portions which are divided structure of the building drum to be rotated without changing their diameters and relative positions by rotating the intermediate and center shafts as well as rotating the outer shaft, for example, under the engagement of the clutch while operating the first motor.

Therefore, when the drum portions are rotated under these condition, it is possible to form a side-reinforcing rubber having a desired shape and dimension by winding and laminating, for example, a ribbon rubber strip having a predetermined width and thickness on the peripheral surface of the drum portions as required.

Furthermore, when the clutch is disengaged and the intermediate shaft and the center shaft are rotated by the first motor preferably under the action of the outer shaft brake, the drum portions drivably connected to the intermediate shaft can be relatively displaced in mutually approaching or separating direction, and the cam members drivably connected to the center shaft can be displaced in the same direction and the same speed as the relative displacement of the drum portions, so that the drum portions can be relatively displaced without involving changes in the diameter.

In addition to rotating the intermediate shaft and the center shaft by the first motor, one shaft of the differential speed reducer is rotated by, for example, rotating the second motor to, thereby, cause a phase difference between the intermediate shaft and the center shaft. Thus, the center shaft rotates with respect to the intermediate shaft to relatively displace the cam members in the axial direction, so that the relative displacement and the radial expansion of the both drum portions can be simultaneously performed.

In this connection, the drum portions can be radially contracted while being relatively displaced in the axial direction by reversely rotating the second motor. Furthermore, the drum portions can be radially expanded/contracted while posing their axial displacements by rotating the second motor in the required direction to displace the cam members on the center shaft in the required direction with the operation of the first motor being stopped.

As above, the tire building apparatus has triaxial structure in which the outer, intermediate and center shafts are coaxially disposed, and the positions in the axial direction and the outer diameters of the drum portions composing the building drum can be changed as required in independence of or in relation to each other. Therefore, it is possible to make one tire building apparatus appropriately accommodate to build various kinds of annular side reinforced rubbers for tires of various sizes in any case.

As the result of this, compared to the case where multiple kinds of drum components for replacement or the like have been previously prepared, equipment cost, administrative cost and the like can be considerably decreased and increase of working man-hours such as for changing the tire size, increase of operation down time of the apparatus and the like can be advantageously suppressed.

Moreover, the building drum can be variously displaced and deformed as required under the action of the first and second motors mounted in the tire building apparatus, therefore, for example, the building apparatus mounted on the driving dolly or the like can be suitably operated at the required position without any relations to outer power supply means, and the form of the building drum before and after the displacements, deformations and the like can be easily self-controlled and self-recognized by feed backing the amounts of displacements, deformations and the like to the motor or others.

Then, according to this self-recognition, it is possible to more quickly and precisely deal with subsequent size changes.

In this apparatus, when the intermediate shaft or, for example, a shaft end thereof is drivably connected to the one drum portion via screw means such as a plurality of thread shafts or a plurality of female screw members rotated by gear mechanism, the building drum forced to be supported in cantilever manner can be displaced in the axial direction as required by a built-in motor without the requirement for an outer power source.

Regardless of the form of driving force applied to the one drum portion, when the one drum portion and the other drum portion are drivably connected via a gear mechanism including a pinion disposed on the outer shaft, such as rack and pinion, both drum portions can be relatively displaced in mutually approaching/separating directions on the same axis smoothly, certainly and precisely on the basis of the input driving force to the one drum portion.

When the cam members are disposed on a hollow outer shaft with passing through long holes formed in the outer shaft to extend in its axial direction and these cam members are screwed into male screw portions of the center shaft, for example, leading in mutually opposite directions to be displaced in mutually opposite directions with the rotation of the center shaft, the drum portions and thus the arc segments composing a primal part of them can be mutually synchronously expanded/contracted in the radial direction, preferably in equal amounts at a time by the cam members provided with inclined cam surfaces inclined in mutually opposite directions, based on the engagements of the cam members with driven inclined surfaces of the segments.

The radial expansion/contraction of the drum portions in this case are more certainly carried out when the cam members are retainingly latched with the arc segments by a linear action guide or the like.

Furthermore, when the first motor is drivably connected to the intermediate shaft, to the center shaft via the differential speed reducer, and to the outer shaft via the clutch, all three shafts can be simultaneously rotated by the first motor to rotate the drum portions for building the side reinforced rubber under a situation where the clutch is engaged, and, on the other hand, both of the intermediate shaft and the center shaft can be rotated to displace the drum portions in approaching/separating directions without radial expansion and contraction under a situation where the clutch is disengaged.

When the second motor is drivably connected to the center shaft via the differential speed reducer, the driving speed of the center shaft under the action of the first and second motor is enhanced more than, for example, that of the center shaft under the action of the first motor alone, so that the drum portions can be radially expanded while being relatively displaced. On the other hand, when the second motor is reversely rotated, the drum portions can be radially contracted while being relatively displaced.

In this connection, by operating the second motor as required while the first motor remains stopped, the outer diameters of the drum portions can be simultaneously increased or decreased in equal amounts.

In the above-mentioned apparatus, when the outer shaft brake is provided to restrain the rotation of the outer shaft, the outer shaft can be certainly prevented from rotating with the rotation of the intermediate shaft and the center shaft by, for example, actuating the brake in a state where the clutch is disengaged. It is noted that the brake can be actuated in a state where the clutch is engaged.

When the center shaft brake is provided to restrain the rotation of the center shaft, in the event of shutting off all the power sources due to an emergency stop, the braking force can resist against the radial contraction of the drum portions caused by, for example, elastic contractive forces of ribbon rubber strips wound and laminated on the drum portions.

When elastic covers are provided to cover the outer peripheral surfaces of arc segments of the drum portions and to air-tightly close the mutually opposing surfaces of the drum portions, a plurality of the arc segments located adjacent to each other can be smoothly continued under the action of the covers regardless of the outer diameters of those segments. As a result of this, the contour of the inner peripheral surfaces of the formed side-reinforcing rubber can be sufficiently close to the circle.

With using the elastic cover portions air-tightly closing the mutually opposing surfaces of the drum portions, the side-reinforcing rubbers molded on the drum portions are closely attached to the inner peripheral surfaces of the cylindrical carcass bands laid on the outer peripheral side of the building drum by the radial expansion of the side-reinforcing rubbers due to the radial expansion of the drum portions, so that the space surrounded by the carcass bands, the side reinforced rubbers, the drum portions and the outer shaft can be air tight regardless of the diameters of the drum portions.

Thus, removing air in the above-mentioned air-tight space via the negative pressure introduction passage leading to between the drum portions can advantageously help the side reinforced rubbers to be closely attached to the inner peripheral surface of the carcass band and can sufficiently diminish likelihood of air entrapment between them.

Further, when a negative pressure suction opening passing through the arc segments of the drum portions and the elastic covers is provided, the adhesiveness of the carcass band and the side-reinforcing rubbers can be enhanced by removing air from the space between the carcass bands and the side-reinforcing rubbers at portions of the building drum outside of the side-reinforcing rubber in the axial direction after the drum portions contact the inner peripheral surface of the carcass band.

In the method for using the tire building apparatus of the present invention, the outer diameter and the axial relative position of a pair of drum portions corresponding to the tire size is specified on the basis of the rotational movements of the center intermediate shafts, so that it is possible to make one building drum always sufficiently and appropriately accommodate to build side-reinforcing rubbers of the various sizes, shapes and dimension during a few working hours.

The side-reinforcing rubbers may be formed by, for example, winding and laminating a ribbon rubber strip on the drum portions and approaching of the side-reinforcing rubbers and axial contraction of the carcass band are performed along with radial expansion of the side-reinforcing rubbers to closely attach the entire outer peripheral surfaces of the side-reinforcing rubbers to the inner peripheral surface of the carcass band over all, so that the side-reinforcing rubbers can be stuck to the carcass band as desired without a need for providing line grooves for forming the side-reinforcing rubber on the building drum, an occurrence of such as crimps on the carcass band, and air entrapment between the carcass band and the side-reinforcing rubbers.

Furthermore, by feeding back the amount of rotation of each shaft or the like to a motor provided on the apparatus, the amounts of displacement, deformation and the like of each member can be precisely controlled, positions, shapes and the like of each member can be precisely recognized and stored, and various kinds of stored data can be easily utilized to subsequent adjustment of the location of the building drum.

Figure 1:
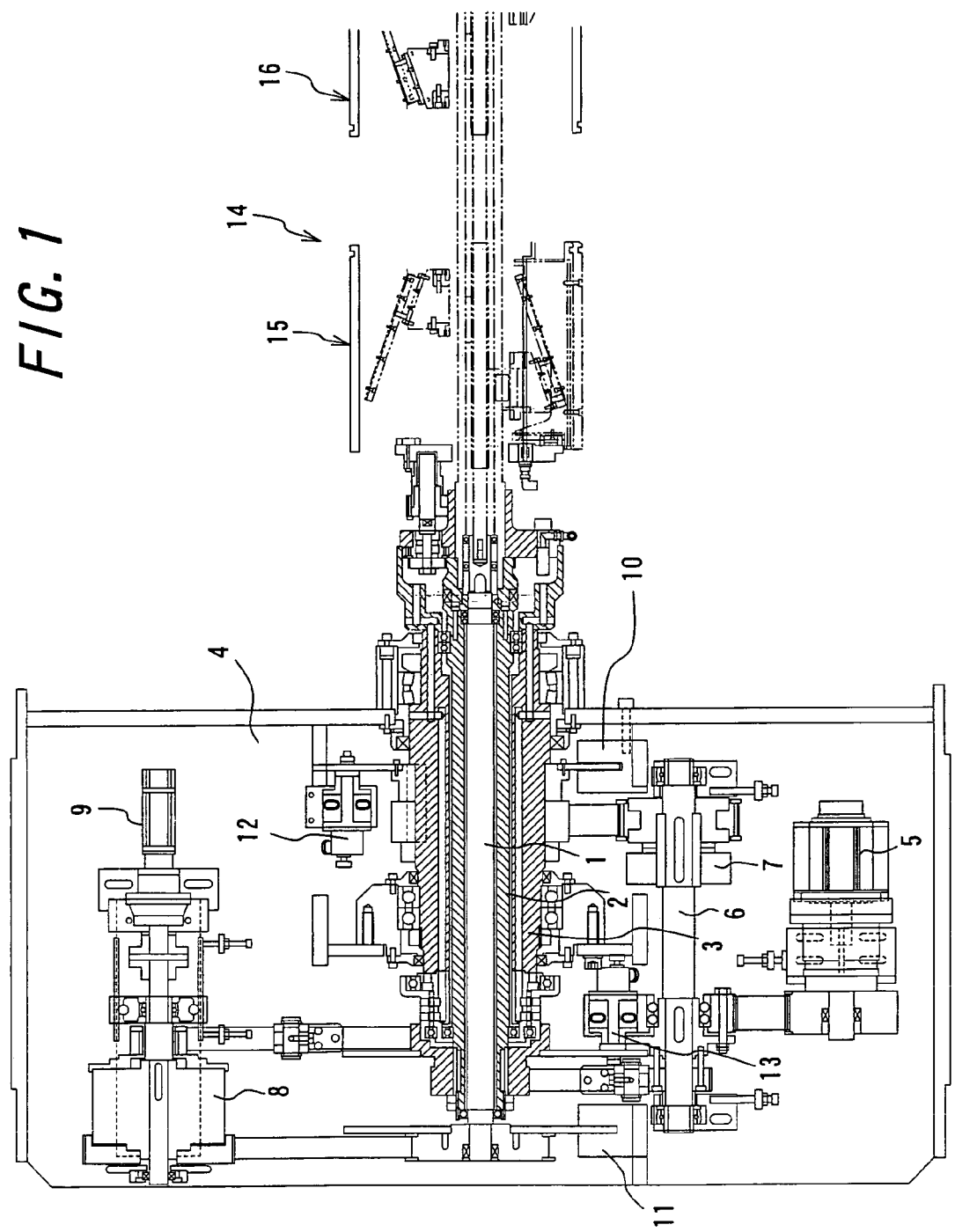
FIG. 1 is a plan view of a driven portion side of an embodiment of an apparatus according to the present invention showing its major part in a section.

DESCRIPTION OF REFERENCE SYMBOLS 1 center shaft
2 intermediate shaft
3 outer shaft
4 mounting flame
5 first motor
6 idle shaft
7 clutch
8 differential speed reducer
9 second motor
10 outer shaft brake
11 center shaft brake
12 outer shaft encoder
13 intermediate shaft encoder
14 building drum
15, 16 drum portion
17 gear mechanism
18 screw means
19 large gear wheel
20 small gear wheel
21 thread shaft
22 female screw member
23 pinion
24, 25 rack
26, 27 male screw portion
28, 29 cam member
28a, 29a inclined cam surface
30, 31 arc segment
30a, 31a driven inclined surface
32, 33 elastic cover
34, 37, 38 negative pressure introduction passage
35, 36 negative pressure suction opening
39 carcass band
40 bead-holding ring
41 bead core
42 bead filler
S1, S2 side-reinforcing rubber

BEST MODE FOR CARRYING OUT THE INVENTION

Figure 2:
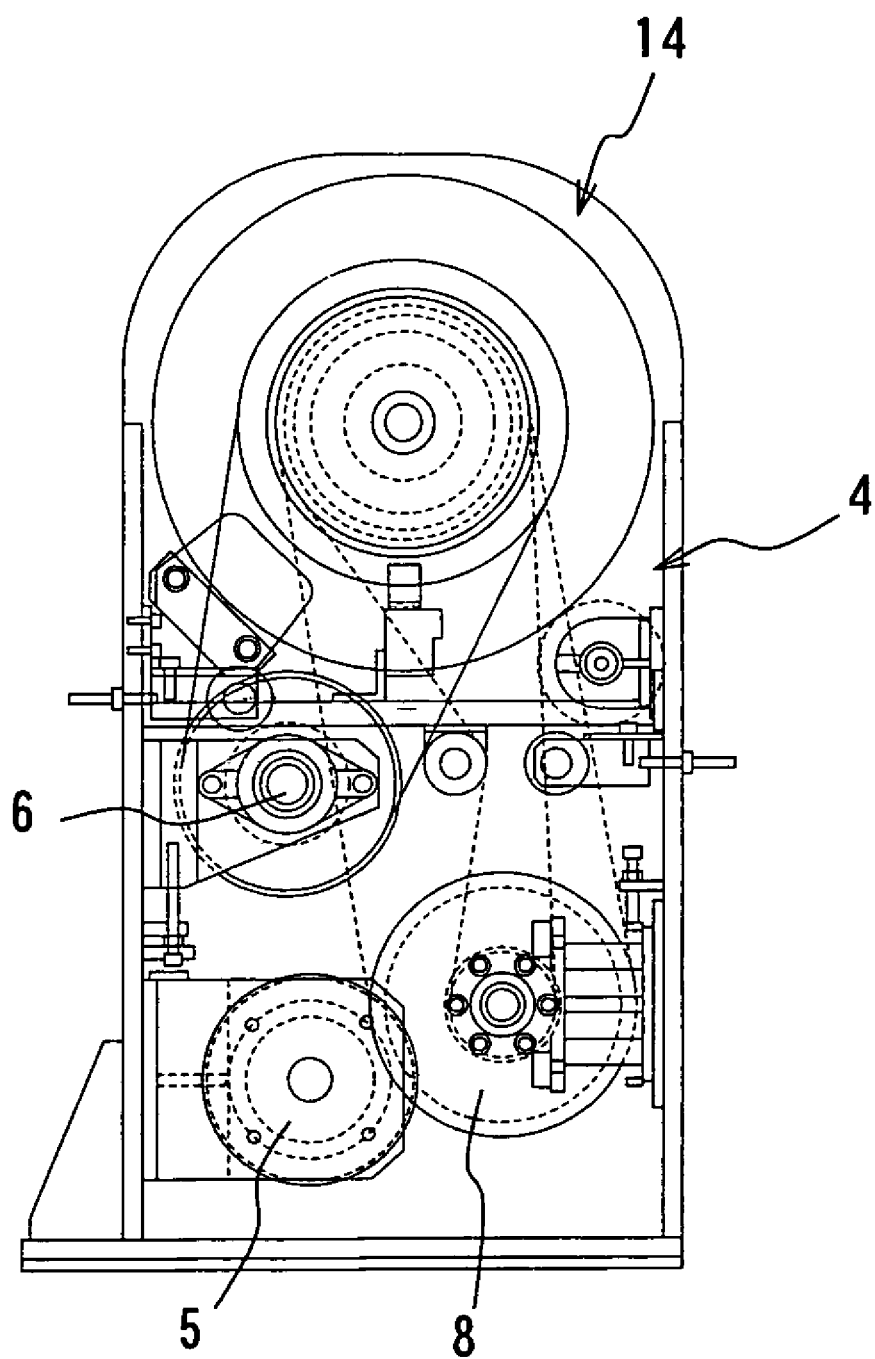
FIG. 2 is a side view of a part of the driven portion side.
Figure 3:
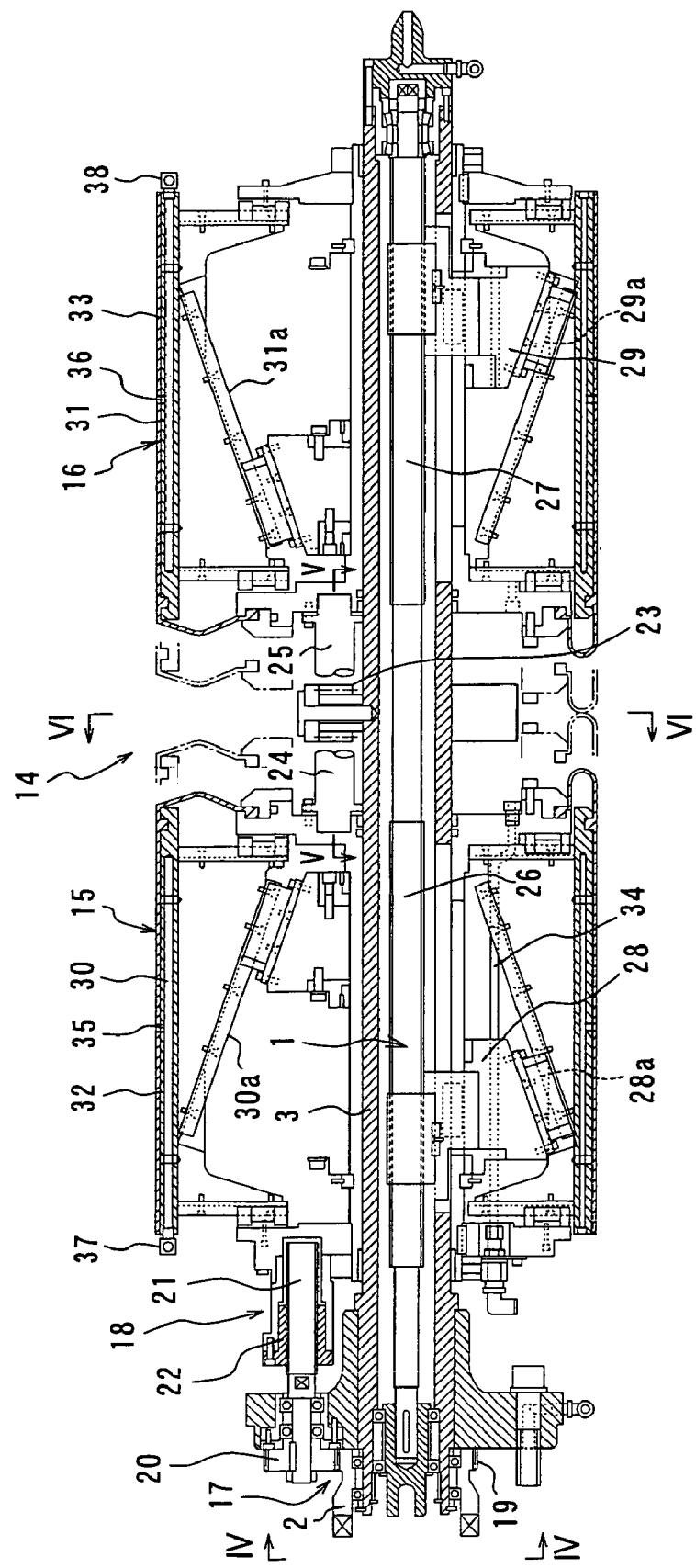
FIG. 3 is a sectional view of the major part showing a building drum side of an embodiment connected to the driven portion side via shafts.

FIG. 1 is a plan view of a driving portion side of an embodiment of an apparatus according to the present invention showing a major part in a section, FIG. 2 is a side view of the driven portion side, and FIG. 3 is a sectional view of the major part showing a building drum side of an embodiment connected to the driven portion side via shafts.

In FIG. 1, the reference numerals 1, 2 and 3 denote a center shaft, an intermediate shaft, and an outer shaft, respectively, which are disposed coaxially with each other in mutually bearingly supporting state, and they altogether are bearingly supported via the outer shaft 3 by an attaching flame 4.

A first motor 5 fixed to the attaching flame 4, which may be a servomotor, is connected by a belt to the intermediate shaft 2 via an idle shaft 6, to the outer shaft 3 via a clutch 7 on the idle shaft 6, which may be, for example, an air clutch, and the intermediate shaft 2 is connected by a belt to the center shaft 1 via a differential speed reducer 8.

Furthermore, a second motor 9, which may be also a servomotor, is connected by a belt to the center shaft 1 via the differential speed reducer 8 disposed on the same axis as the second motor. The belt for this connection can be commonly used as the belt for connecting the intermediate shaft 2 to the center shaft 1 via the differential speed reducer 8.

An outer shaft brake 10 for preventing an unexpected rotation of the outer shaft 3 is attached to and provided on the flame 4 and a center shaft brake 11 for functioning to prevent an unexpected rotation of the center shaft 1 which loses its holding power upon turning off a motor power in case of an emergency stop or the like.

Furthermore, an outer shaft encoder 12 such as the one feeding back signals of the amount of rotational displacement of the outer shafts 3 to the first motor 5, which may be a servomotor, is attached to and provided on the flame 4, and an intermediate shaft encoder 13 such as the one feeding back signals of the amount of rotational displacement of the intermediate shaft 2 to the motor 5 is provided on the flame 4.

That is, each shaft needs to be directly connected to a servomotor or an encoder and monitored constantly, but the intermediate shaft 2 and the outer shaft 3 are to be driven by the first motor 5 alone with changing a clutch, and these shafts 2 and 3 are directly connected to the encoders 13 and 12, respectively, and monitored constantly since it is difficult to know the current positions of these shafts.

Referring now to FIG. 3, a building drum 14 is supported on the outer shaft 3. The building drum 14 has an uniform outer diameter over its entire length and consists of axially equally divided two drum portions 15 and 16 which are relatively displaced in mutually approaching and separating directions on the outer shaft 3 and are radially expanded and contracted.

Figure 4:
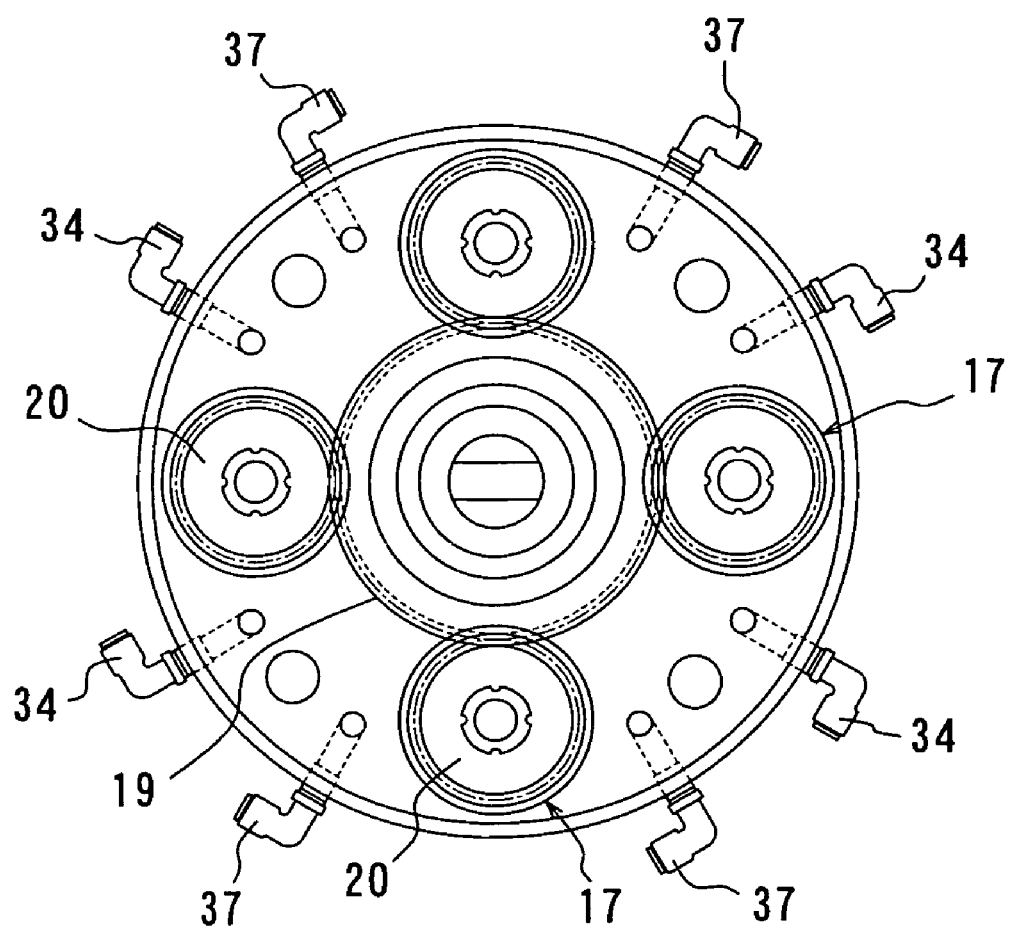
FIG. 4 is a view in the direction of the arrow IV-IV in FIG. 3.

In order to displace these paired drum portions 15, 16 in the axial direction, one drum portion 15 located adjacent to a driving portion is drivably connected to the tip of the intermediate shaft 2 via a gear mechanism 17 and a screw means 18 rotated by the gear mechanism 17. That is, as shown in the figure, a large gear wheel 19 is indirectly equipped at the tip of the intermediate shaft 2, and, as shown in FIG. 4 which is a view in the direction of the arrow IV-IV in FIG. 3, small gear wheels 20 are arranged at four points on the peripheral surface of the large gear wheel 19 and meshed with the large gear wheel 19 to, thereby, form the gear mechanism 17. A thread shaft 21 of each gear mechanism 17 integrally attached to the small gear wheel 20 is screwed into a female screw member 22 provided on the drum portion 15 to form the screw means 18.

It is noted that the number of small gear wheels 20 meshed with the large gear wheel 19 may be appropriately increased or decreased as required, and that the screw means 18 may also be a ball-circulating type. In this screw means, contrary to the structure shown in the figure, the female screw member may be integrally provided on the small gear wheel 20, and the thread shaft may be provided on the drum member 15.

According to the structure shown in the figure, the small gear wheels 20 and the thread shafts 21 are rotated in relation to the one drum portion 15 of the building drum 14, which is supported in cantilever manner, by rotating the intermediate shaft 2, and therefore the drum portion 15 can be displaced on the outer shaft 3 in the axial direction thereof.

Figure 5:
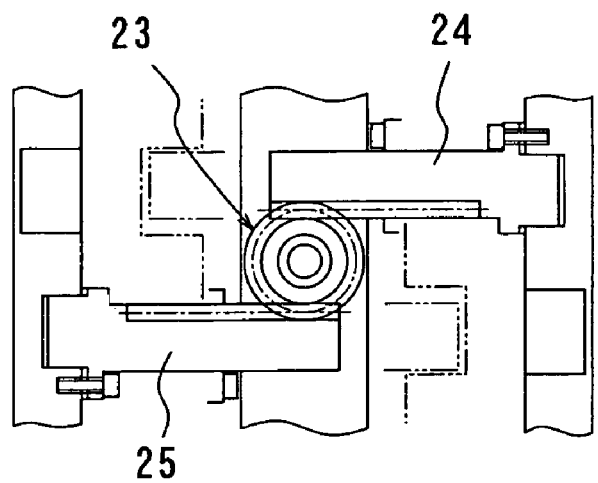
FIG. 5 is a view in the direction of the arrow V-V in FIG. 3.
Figure 6:
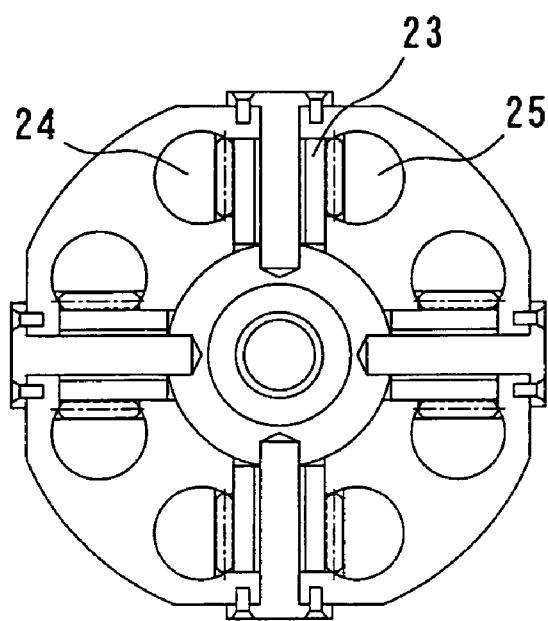
FIG. 6 is a sectional view taken along the line VI-VI in FIG. 3.

In this embodiment, in order to transmit such displacements of the one drum portion 15 to the other drum portion 16 of the cantilever-supported building drum 14 as well, the pinion 23 is attached on the peripheral surface at the approximately central portion of the outer shaft 3 with directing its central axis in the radial direction, and racks 24, 25 provided on and projected from the drum portions 15, 16 are meshed with the pinion 23 and arranged to mutually face in the diametral direction of the pinion as showing in FIG. 5, which is a view in the direction of the arrow V-V in FIG. 3. Preferably, this rack and pinion mechanism is provided at a plurality of positions in the circumferential direction as showing in FIG. 6 a sectional view along the line VI-VI in FIG. 3.

Accordingly, when the one drum portion 15 is displaced in the axial direction by the rotational movement of the intermediate shaft 2 and the pinion 23 is rotated in accordance with the displacement of the one drum portion by the rack 24 provided on and projected from the drum portion 15, the other drum portion 16 is displaced on the outer shaft 3 in the direction opposed to the displacement direction of the one drum portion 15 under the action of the rack 25 provided on and projected from the other drum portion 16. As a result, axially relative displacements of the paired drum portions 15, 16 in mutually approaching and separating directions can be realized.

Furthermore, in order to radially expand and contract the drum portions 15, 16, for example, male screw portions 26 and 27, for example, leading in the mutually opposite directions are provided on the center shaft 1 extending within the outer shaft 3 in such a manner that they are spaced with each other on either side of the central portion of the center shaft, and cam members 28 and 29 passing through and provided on the outer shaft 3 are screwed into the male screw portions 26, 27 via female screw portions, so that the cam members 28, 29 can be displaced, under the rotation of the center shaft 1, in mutually approaching and separating directions along elongated slits which are provided on the outer shaft 3 and linearly extended in the axial direction of the outer shaft.

Each drum portion 15, 16 is composed mainly of a plurality of arc segments 30 and 31 which are disposed at a predetermined pitch in the circumferential direction and can be displaced in a radial direction. Each of the arc segments 30, 31 can be displaced in the radial direction in accordance with the axial displacements of the cam members 28, 29 under the engagement of driven inclined surfaces 30a and 31a of the arc segments 30 and 31, respectively, with inclined cam surfaces 28a and 29a of the corresponding cam members 28a and 29a, respectively, inclined in mutually opposite directions, and more preferably under the fitting of a linear action guide as shown in the figure. In the embodiment shown in the figure, such displacements of the arc segments 30, 31 in the radial direction are guided by the direct action guides disposed at both end portions in the axial direction of the arc segments.

Thus, all of the arc segments 30 and 31 of the drum portions 15 and 16 are displaced in the radial direction by all of the cam members 28 and 29 corresponding to the segments 30 and 31, respectively, so that both of the drum portions 15 and 16 can be radially expanded and contracted at equal amounts in synchronization with each other.

In this figure, there are provided elastic covers 32 and 33 such as rubber covers covering the outer peripheral surfaces of the arc segments 30, 31 of the drum portions 15, 16, and these elastic covers 32, 33 air-tightly close areas of the mutually facing surfaces in which the linear action guides is radially moving. Furthermore, at least one, and, for example, as shown in FIG. 4, multiple negative pressure introduction passages 34 passing through the one drum portion 15 and opening to between the both drum portions are provided, and negative pressure suction openings 35 and 36 are arranged to pass through the arc segments 30, 31 of the drum portions 15, 16 and the elastic covers 32, 33. In this figure, the reference numerals 37 and 38 denote negative pressure introduction passages leading to the negative pressure suction openings 35 and 36, respectively.

In the tire building apparatus having the above-mentioned structure, the various kinds of displacements and transformations of the drum portions 15, 16 can be realized by, in short, operating a motor, a clutch and the like in the manners as shown in Table 1.

TABLE 1

|  | Rotation | Radial expansion/ contraction | Axial displacement | Radial expansion/ contraction and axial displacement |
|---|---|---|---|---|
| First motor (5) | ON | OFF | ON | ON |
| Second motor (9) | OFF | ON | OFF | ON |
| Clutch (7) | ON | Either | OFF | OFF |
| Outer shaft brake (10) | OFF | ON | ON | ON |
| Center shaft brake (11) | OFF | OFF | OFF | OFF |

When such tire building apparatus is actually used, the intermediate shaft 2 and the center shaft 1 are firstly simultaneously rotated by the first motor 5, so that the relative positions of drum portions 15, 16 in the axial direction are set according to the size of a tire, and the drum portions 15, 16 are radially expanded and contracted according to the size of a tire by the relative displacements of the cam members 28, 29 due to the operation of the second motor 9.

After that, only the first motor 5 is operated and the clutch is engaged to rotate the outer shaft 3 along with the center shaft 1 and the intermediate shaft 2, so that the drum portions 15, 16 on the outer shaft 3 are integrally rotated without changing the relative positions and the outer diameters thereof. While the drum portions are continuously rotated in this way, required side-reinforcing rubbers having annular shapes are formed on the drum portions 15, 16 by winding and laminating, for example, ribbon rubber strips.

FIG. 7(a) is a schematic sectional view in the meridional direction showing half portions of the side-reinforcing rubbers S1 and S2 formed on the drum portions 15, 16 in this way. As shown by imaginary lines in the figure, in order to closely attach the entire outer peripheral surfaces of the side-reinforcing rubbers S1, S2 completely to the inner peripheral surfaces of a cylindrical carcass band 39 subsequently positioned and disposed on the outer peripheral side of the building drum 14, these side-reinforcing rubbers S1, S2 are, at first, radially expanded and contracted with the drum portions 15, 16 by operating the second motor 9 and thus rotating the center shaft 1 to displace the cam members 28, 29

Figure 7:
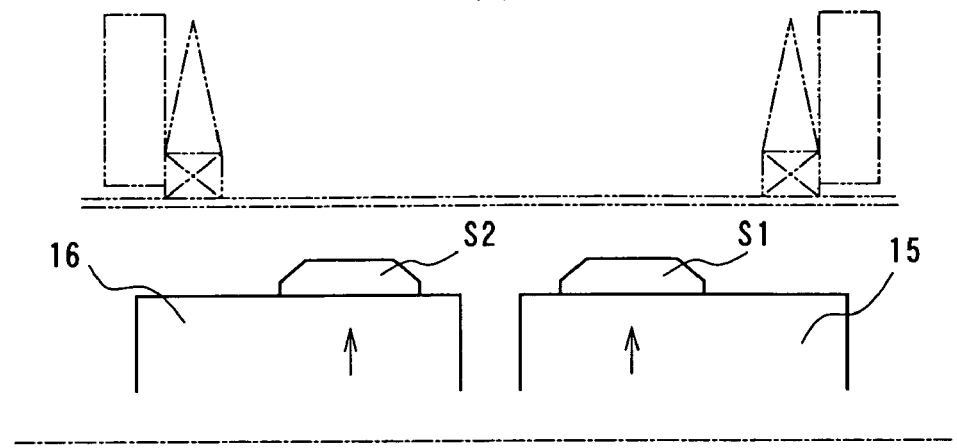
FIG. 7 is a schematic process drawing showing actions of the building drum in a cross section in the meridional direction.
Figure 7:
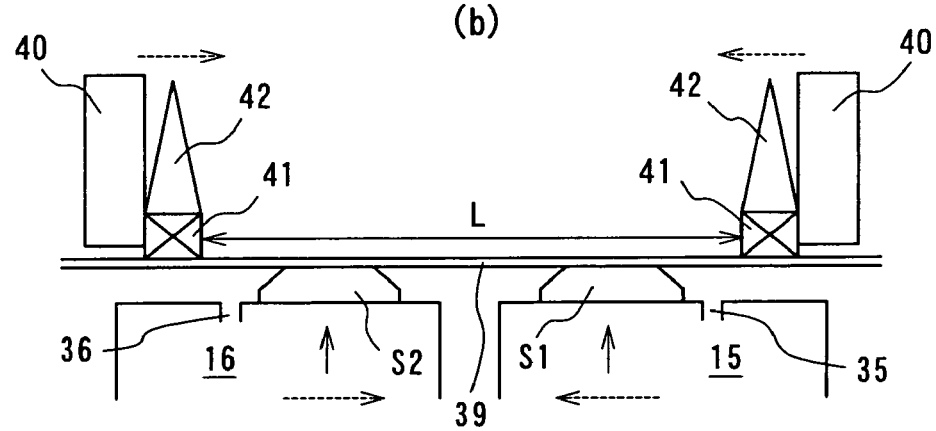
Figure 7:
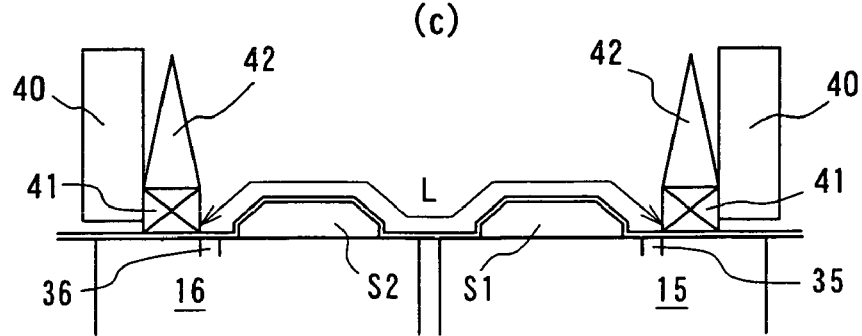
Figure 8:
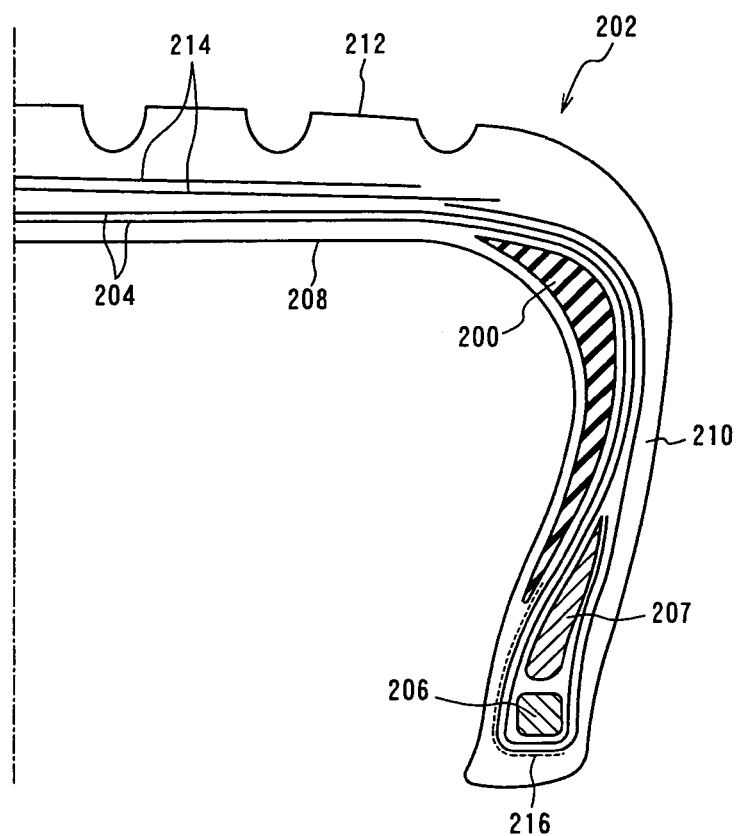
FIG. 8 is a cross sectional view of a runflat tire showing the half part of it.
Figure 9:
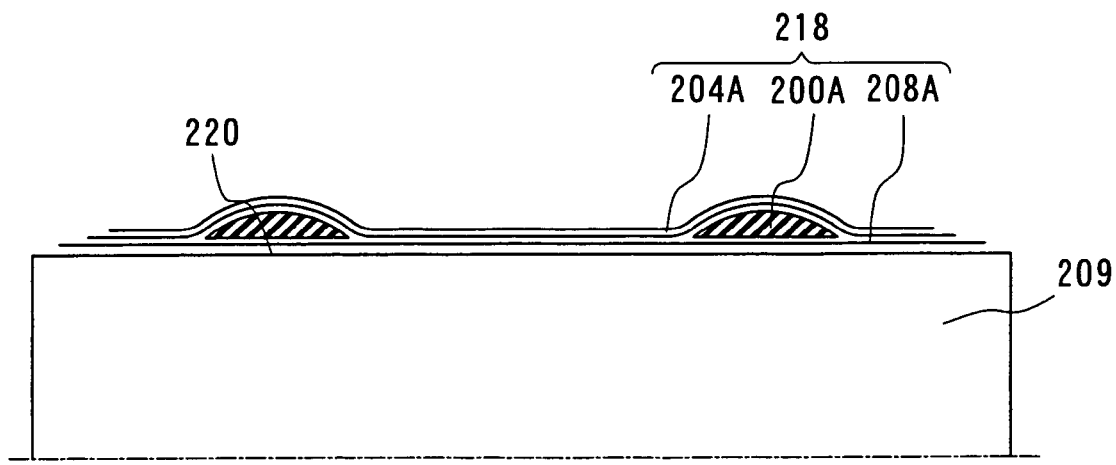
FIG. 9 is a schematic sectional view in the meridional direction showing conventional processes of forming and sticking a side-reinforcing rubber.

After the radial expansion of the side-reinforcing rubbers S1 and S2 brings the maximum diameter portions of the side-reinforcing rubbers S1 and S2 into contact with the inner peripheral surface of the carcass band 39 held together with the bead cores 41 and the bead fillers 42 by a pair of bead holding rings 40 as shown in FIG. 7(b), the first motor 5 is operated to displace the drum portions 15, 16 in mutually approaching directions as shown by the imaginary lines in FIG. 7 (b) while radially expanding the drum portions 15, 16 in accordance with the action of the differential speed reducer 8 with the second motor 9 being continuously operated, and to radially contract the cylindrical carcass band 39 with approaching displacements of the bead holding rings 40. As a result, as shown in FIG. 7(c), the entire outer peripheral surfaces of the side-reinforcing rubbers S1, S2 are tightly attached to the inner peripheral surface of the carcass band 39 without an occurrence of crimps or the like on the carcass band 39 and an entrapment of air therebetween.

In this case, when a negative pressure is applied via the negative pressure introduction passage 34 into a closed space surrounded by the carcass band 39, the side reinforced rubbers S1 and S2, the drum portions 15 and 16 having the elastic covers and the outer shaft 3 to remove air from the closed space after at least the maximum diameter portions of the side-reinforcing rubbers S1 and S2 contact the carcass band 39, the entrapment of air between the carcass band 39 and the side reinforced rubbers S1, S2 can be more effectively prevented. In addition to this removal of air, when air is also removed via the negative pressure suction opening 35, 36 located outside of the side-reinforcing rubbers S1, S2, the entrapment of air between the side reinforced rubbers S1, S2 and carcass band 39 at the bead core side of the side-reinforcing rubbers S1, S2 can be further effectively prevented.

In this way, after tightly attaching the side-reinforcing rubbers S1, S2 to the carcass band 39, the second motor 9 is operated to radially contract the drum portions 15, 16 and, therefore, the rubbers S1, S2 are completely delivered on the carcass band 39.

After that, the carcass band 39 attached with the side reinforced rubbers S1, S2 are slipped off the building drum 14 and transported to the next working process. At the same time, the building drum 14 is prepared for building another side-reinforcing rubber for a tire having the same size or the different. Afterward, the above-mentioned processes are repeated.

The invention claimed is:

1. An apparatus for building a tire comprising an outer shaft, an intermediate shaft, and a center shaft disposed coaxially with each other, a building drum supported on the outer shaft and having a uniform outer diameter over the entire length, and means for rotating these shafts disposed on one side of the building drum, wherein the building drum comprises two drum portions that are axially divided and which are displaceable in mutually approaching and separating directions and are adapted to be radially expanded and contracted, the intermediate shaft is connected to one drum portion, the one drum portion is drivably connected to the other drum portion so that the one drum portion and the other drum portion are able to reciprocably move in mutually opposite directions in the axial direction, and cam members adapted to bring the drum portions into radial expansive/contractive transformations are connected to the center shaft, and wherein the apparatus further comprises a first motor constantly drivably connected to the intermediate shaft and to the center shaft via a differential speed reducer and selectively drivably connected to the outer shaft, and a second motor constantly drivably connected to the center shaft via a differential speed reducer.

2. The tire building apparatus according to claim 1, wherein the intermediate shaft is drivably connected to the one drum portion with a screw means shaft rotated by a gear mechanism.

3. The tire building apparatus according to claim 1, wherein each drum portion is drivingly connected to each other with a gear mechanism including one or more pinions disposed on the outer shaft.

4. The tire building apparatus according to claim 1, wherein each cam member passes through the outer shaft and is screwed into the center shaft to be able to move in mutually opposite directions or in the same directions.

5. The tire building apparatus according to claim 1, wherein each cam member is provided with an inclined cam surface and is engaged with a driven inclined surface of an arc segment composing a primary part of each drum portion, wherein the inclined cam surfaces incline in mutually opposite directions from each other.

6. The tire building apparatus according to claim 1, wherein the first motor is drivably connected to the intermediate shaft and to the center shaft via a differential speed reducer and to the outer shaft via a clutch.

7. The tire building apparatus according to claim 1, wherein the second motor is drivably connected to the center shaft via a differential speed reducer.

8. The tire building apparatus according to claim 1, further comprising an outer shaft brake to restrain the rotation of the outer shaft.

9. The tire building apparatus according to claim 1, further comprising an center shaft brake to restrain the rotation of the center shaft.

10. The tire building apparatus according to claim 5, further comprising an elastic cover to cover the outer peripheral surfaces of the arc segment of each drum portion and to air-tightly close the mutually opposed surface of each drum portion.

11. The tire building apparatus according to claim 10, comprising a negative pressure introduction passage to between each drum portion.

12. The tire building apparatus according to claim 10, further comprising a negative pressure suction opening passing through the arc segment of each drum portion and the elastic cover.

13. A method for using a tire building apparatus to form a side-reinforcing rubber and stick the formed side-reinforcing rubber to an inner peripheral surface of a cylindrical carcass band laid on the outer peripheral side of a building drum, the method comprising:

providing the tire building apparatus which comprises an outer shaft, an intermediate shaft, and a center shaft disposed coaxially with each other, a building drum supported on the outer shaft and having a uniform outer diameter over the entire length, and means for rotating these shafts disposed on one side of the building drum, wherein the building drum comprises of two drum portions that are axially divided and which are displaceable in mutually approaching and separating directions and are adapted to be radially expanded and contracted, the intermediate shaft is connected to one drum portion, the one drum portion is drivably connected to the other drum portion so that the one drum portion and the other drum portion are able to reciprocably move in mutually opposite directions in the axial direction, and cam members adapted to bring the drum portions into radial expansive/contractive transformations are connected to the center shaft, and wherein the apparatus further comprises a first motor constantly drivably connected to the intermediate shaft and to the center shaft via a differential speed reducer and selectively drivably connected to the outer shaft, and a second motor constantly drivably connected to the center shaft via a differential speed reducer;

determining the outer diameters and axial relative positions of paired drum portions corresponding to the tire size and the relative positions in accordance with rotating movements of center and intermediate shafts;

shaping the side-reinforcing rubber having a required shape and dimension into an annular shape on the drum portions while rotating all of the shafts;

radially expanding the side-reinforcing rubbers toward the carcass band laid on the outer peripheral side of the building drum in accordance with displacements of the cam members following the rotation of the center shaft; and after the maximum diameter portion of the side-reinforcing rubber are abutted against the inner peripheral surface of the carcass band, simultaneously performing an approaching displacement of the both drum portions and therefore the both side-reinforcing rubbers and an axially contracting displacement of the carcass band based on the rotation of the intermediate shaft while continuously expanding the side-reinforcing rubbers further to tightly contact the entire outer peripheral surfaces of the side reinforced rubbers with the inner peripheral surfaces of the carcass band.

14. The method of using the tire building apparatus according to claim 13, wherein air is removed from between both drum portions in the state where the side-reinforcing rubbers are in contact with the inner peripheral surface of the carcass band due to the radial expansion of the side-reinforcing rubber.

* * * * *